US008625034B2

(12) United States Patent
Campbell et al.

(10) Patent No.: US 8,625,034 B2
(45) Date of Patent: Jan. 7, 2014

(54) SEATBACK ENTERTAINMENT DISPLAY SYSTEM

(75) Inventors: Douglas C. Campbell, Holland, MI (US); James B. Price, Holland, MI (US); Steven G. Schultz, Holland, MI (US); Theodore J. Stokes, Holland, MI (US); Eric B. Michalak, Westland, MI (US); Joseph F. Prosniewski, Brownstown Township, MI (US); Alan G. Greene, Grandville, MI (US); David P. Thimm, Plymouth, MI (US); Joon K. Lee, Westland, MI (US)

(73) Assignee: Johnson Controls Technology Company, Holland, MI (US)

( * ) Notice: Subject to any disclaimer, the term of this patent is extended or adjusted under 35 U.S.C. 154(b) by 596 days.

(21) Appl. No.: 12/158,672

(22) PCT Filed: Dec. 18, 2006

(86) PCT No.: PCT/US2006/048006
§ 371 (c)(1),
(2), (4) Date: Apr. 17, 2009

(87) PCT Pub. No.: WO2007/075461
PCT Pub. Date: Jul. 5, 2007

(65) Prior Publication Data
US 2009/0316057 A1    Dec. 24, 2009

Related U.S. Application Data

(60) Provisional application No. 60/753,080, filed on Dec. 22, 2005.

(51) Int. Cl.
*H04N 5/64*    (2006.01)
(52) U.S. Cl.
USPC ........................ 348/837; 348/836; 297/217.3

(58) Field of Classification Search
USPC ............. 348/836–843; 349/58; 248/682, 371, 248/157, 295.11, 917, 919, 923; 297/188.05, 217.1, 217.3, 217.6, 410, 297/391, 188.04, 188.01, 188.21, 185; 224/275, 282
See application file for complete search history.

(56) References Cited

U.S. PATENT DOCUMENTS

| 4,720,146 | A  | * | 1/1988 | Mawbey et al. | ............... 297/409 |
| 6,698,832 | B2 | * | 3/2004 | Boudinot | ................... 297/217.4 |

(Continued)

FOREIGN PATENT DOCUMENTS

| DE | 20 2004 000 292 U1 | 4/2004 |
| DE | 20 2004 008 205 U1 | 8/2004 |

(Continued)

OTHER PUBLICATIONS

International Search Report and Written Opinion of the International Searching Authority for International Application No. PCT/US2006/048006; mailed Jun. 4, 2008; 14 pages.

(Continued)

*Primary Examiner* — Brian Glessner
*Assistant Examiner* — Adam Barlow
(74) *Attorney, Agent, or Firm* — Foley & Lardner LLP (57) ABSTRACT

A seatback entertainment display system for a vehicle is provided having a support member extending from a seatback frame, and an adjustment mechanism coupled to the support member, and a display device coupled to the adjustment mechanism. The support member may be a cantilever type beam or frame extending upwardly from the seatback at a position behind and adjacent to a headrest. The support member may also be a pair of rods arranged to fixedly receive the display device and movably receive the headrest. The adjustment device may include any one or more of a forward-rearward tilting mechanism, a side to side pivoting mechanism and an up-down translation mechanism. The seatback entertainment display system is adaptable to optimize a viewing angle for a rear seat occupant of the vehicle, throughout a normal adjustment range of the seat.

4 Claims, 6 Drawing Sheets

(56) References Cited

U.S. PATENT DOCUMENTS

| | | | |
|---|---|---|---|
| 6,739,654 B1* | 5/2004 | Shen et al. | 297/188.04 |
| 7,201,354 B1* | 4/2007 | Lee | 248/231.9 |
| 7,201,356 B2* | 4/2007 | Huang | 248/309.1 |
| 7,290,833 B2* | 11/2007 | Park et al. | 297/217.3 |
| 7,360,833 B2* | 4/2008 | Vitito | 297/217.3 |
| 7,472,458 B2* | 1/2009 | Oddsen, Jr. | 16/255 |
| 7,636,930 B2* | 12/2009 | Chang | 725/75 |
| 7,690,611 B2* | 4/2010 | Asamarai et al. | 248/284.1 |
| 7,758,116 B2* | 7/2010 | Hattori et al. | 297/217.3 |
| 2003/0121943 A1* | 7/2003 | Chou | 224/275 |
| 2004/0160096 A1 | 8/2004 | Boudinot | |
| 2004/0239155 A1* | 12/2004 | Fourrey et al. | 297/163 |
| 2005/0140191 A1* | 6/2005 | Curran et al. | 297/217.3 |
| 2005/0174498 A1* | 8/2005 | Wu | 348/837 |
| 2008/0136230 A1* | 6/2008 | Ling | 297/217.6 |
| 2008/0252798 A1* | 10/2008 | Vitito | 348/837 |

FOREIGN PATENT DOCUMENTS

| | | |
|---|---|---|
| EP | 1 655 177 B1 | 5/2006 |
| FR | 2 870 800 | 12/2005 |
| JP | 05-020656 U | 3/1993 |
| JP | 11-151986 A | 6/1999 |
| JP | 2003-327051 A | 11/2003 |
| WO | WO 2004/028861 A2 | 4/2004 |
| WO | WO 2004/054847 A1 | 7/2004 |

OTHER PUBLICATIONS

Chinese Office Action for CN 200680052819.6, dated Dec. 18, 2009, 5 pages.

Second Chinese Office Action for CN 200680052819.6, dated May 20, 2011, 5 pages.

Unofficial Translation of Chinese Office Action for CN 200680052819.6, dated Dec. 18, 2009, 4 pages.

Unofficial Translation of Second Chinese Office Action for CN 200680052819.6, dated May 20, 2011, 4 pages.

Notice of Reasons for Rejection in Japanese Patent Application No. 2008-547358 dated May 8, 2012.

Notice of Preliminary Rejection dated Jun. 18, 2013 as received in Korean Patent Application No. 10-2008-7015242.

* cited by examiner

SEATBACK ENTERTAINMENT DISPLAY SYSTEM

CROSS REFERENCE TO RELATED APPLICATIONS

The present Application claims the benefit of priority under 35 U.S.C. §119(e) to U.S. Provisional Patent Application No. 60/753,080, titled Seatback Entertainment Display System, filed on Dec. 22, 2005, the disclosure of which is hereby incorporated by reference.

BACKGROUND

The present inventions relate generally to a seatback entertainment system for use in a vehicle (e.g., automobiles such as cars, trucks, and the like; airplanes, boats, trains, busses, etc.). More specifically, the present inventions relate to a seatback entertainment display system having a high-mount arrangement that permits a wide range of adjustment intended to accommodate or adapt to repositioning of the seatback and headrest and to optimize a viewing angle for viewers in the vehicle. The seatback entertainment display system may also include a wide variety of other components such as a DVD player, speakers, lighting sources (e.g. ambient, task, reading, etc.), connectivity ports, headphone jack(s), auxiliary input(s), wireless transmitters/receivers, etc.

Seatback entertainment display systems for use with the seats of vehicles such as automobiles are generally known and typically include a display mounted or fixed in a portion of the seatback or a headrest portion of the seat back. However, such known displays for use in a seatbacks have certain disadvantages. For example, movement of the seatback (such as between a reclined position and an upright or fold-forward position tend to change the viewing angle of the display as observed by users (such as users seated in rear seats of the vehicle) to a less-than-optimum position.

Also, such known displays that are mounted into the seatback or headrest typically have an elevation that is determined by the elevation of the seatback or the headrest and the elevation tends to change if the elevation of the seat or the headrest is changed by an occupant of the seat. Further, the viewing angle of the known displays tends to be limited and not readily adaptable to occupants of various sizes that are viewing the display device (e.g. adults, children, etc.). By further way of example, the known seatback displays are generally not adjustable from side-to-side to enhance the viewing angle of rear seat viewers of the display that are sitting in an offset relationship from the display (such as a viewer sitting in the "middle" of a rear seat arrangement in a vehicle. Although some of the known rear seat display devices that are mounted in a seatback may provide some adjustment, such adjustment capabilities are generally limited and not satisfactory.

Accordingly, it would be advantageous to provide a seatback entertainment display system that overcomes the disadvantages of the known seatback displays. It would also be advantageous to provide a seatback entertainment display system having a "high mount" arrangement that is cantilevered from a top portion of the seatback behind a headrest of the seat. It would also be advantageous to provide a seatback entertainment display system that permits the display to be tilted forward and rearward. It would also be advantageous to provide a seatback entertainment display system that permits a display to be pivoted from side-to-side. It would also be advantageous to provide a seatback entertainment display system that permits the display device to translate vertically in an upwardly and downwardly manner. It would also be advantageous to provide a seatback entertainment display system that permits the display device to be tilted, pivoted or translated to accommodate or adapt to a desired viewing angle for a viewer, and in a manner that is generally independent of the adjustment range of the seatback and/or headrest by an occupant of the seat. It would also be advantageous to provide a seatback entertainment display system having components such as a DVD player, speakers, lighting sources (e.g. ambient, task, reading, etc.), connectivity ports, headphone jack(s), auxiliary input(s), wireless transmitters/receivers, etc. It would also be desirable to provide a seatback entertainment system that movably integrates a headrest and fixedly integrates a display device (with a movably display screen) onto a structure (e.g. a bracket, pair of rods, etc.) extending from the seatback frame.

Accordingly, it would be desirable to provide a seatback entertainment display system for a vehicle having any one or more of these or other advantageous features.

SUMMARY

According to one aspect of the invention, a seatback entertainment display system for a vehicle seat having a seatback frame for supporting a seatback and a headrest is provided. The system includes a support member coupled to the seatback frame and extending adjacent to and behind the headrest. An adjustment device is coupled to the support member, and a display device is coupled to the adjustment mechanism.

According to another aspect of the invention, a seatback entertainment system for use with a vehicle seat having a seatback and a headrest is provided. The system includes a frame for the seatback of the vehicle seat, where the frame including a support member extending above the seatback and behind the headrest. An adjustment device is provided and includes a first portion and a second portion, where the first portion is coupled to the support member. A display device is coupled to the second portion of the adjustment device.

According to a further aspect of the invention, a seat for a vehicle includes a seat bottom frame coupled to a seatback frame and a headrest coupled to a top portion of the seatback frame. A support member extends from the top portion of the seatback frame and adjacent to the headrest. An adjustment device is coupled to the support member and a display panel is coupled to the adjustment device.

According to a further aspect of the invention, a seat for a vehicle includes a seat bottom frame coupled to a seatback frame. At least one support member extends from the seatback frame. A display device having a body portion is coupled to the support member in a generally fixed position, and a screen portion is pivotally coupled to the body portion along a top edge of the screen portion for movement to any one of a plurality of viewing positions. A headrest is movably coupled to the support member for positioning within a predetermined adjustment range relative to the seatback and the body portion of the display device

DETAILED DESCRIPTION

FIGS. 1-7 illustrate one exemplary embodiment of a seatback entertainment display system for use in a vehicle (e.g., automobiles such as cars, trucks, sport utility vehicles, minivans, buses, and the like; airplanes, boats, trains, etc.). The seatback entertainment display system is shown and described by way of example to include a display device and other components for use with a seatback of a front seat of a vehicle, for viewing by occupants of the vehicle ("viewers") that are seated behind the front seat. Such a display device may be provided in a wide variety of sizes, shapes, components, and configurations, and the system may be used within any seat (such as a train, airplane, bus, etc.) where viewers are seated behind another seat. All such variations are intended to be within the scope of the inventions.

Figure 6A:
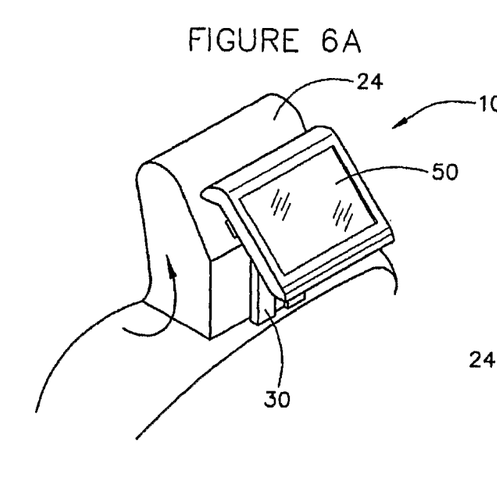
FIG. 6A is a schematic representation of a perspective view of a seatback entertainment display system with the display device in another position according to an exemplary embodiment.
Figure 6B:
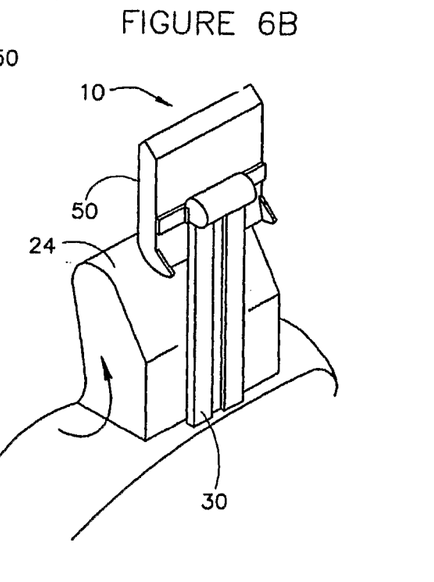
FIG. 6B is a schematic representation of the perspective view of a seatback entertainment display system of FIG. 6A, with the display device in another position to permit folding of the seatback, according to an exemplary embodiment.
Figure 7:
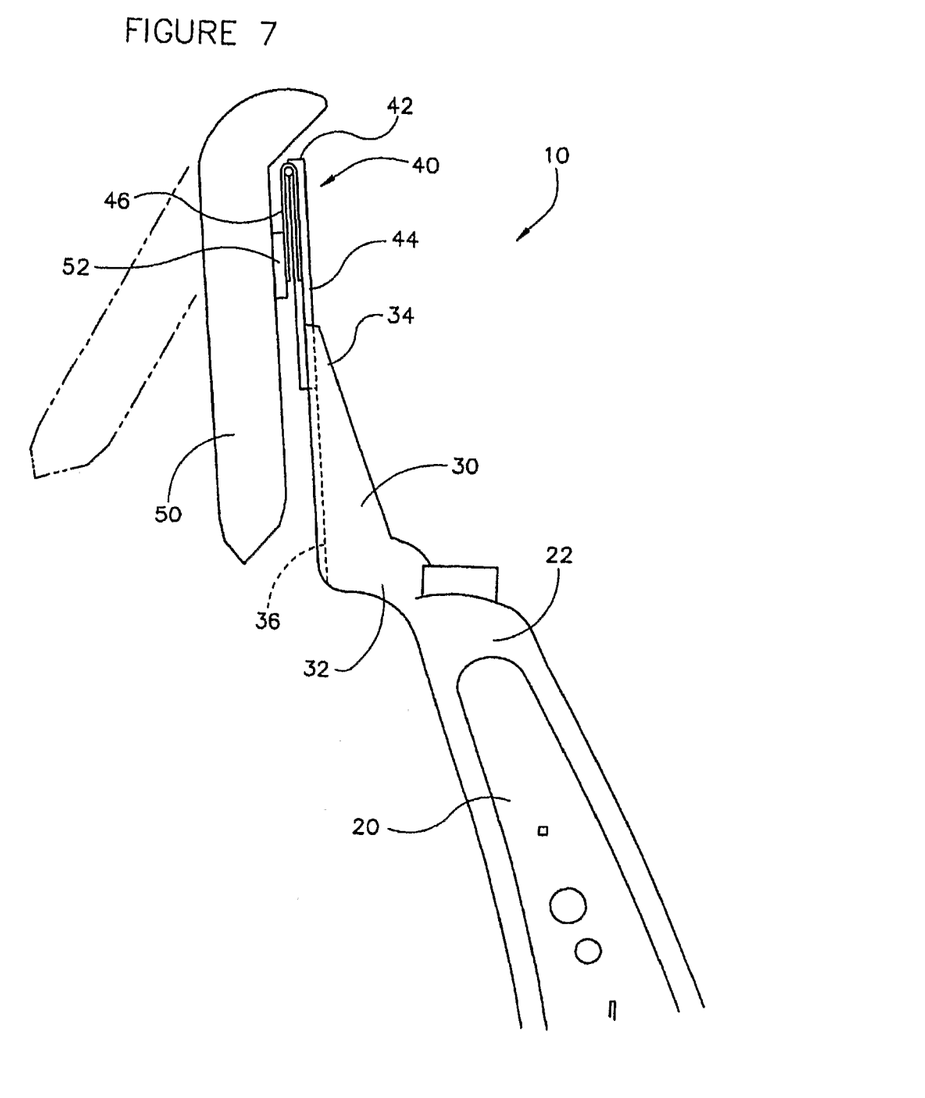
FIG. 7 is a schematic representation of a side view of a seatback entertainment display system according to an exemplary embodiment.

Referring to FIG. 7, a seatback entertainment display system 10 for a vehicle is shown according to an exemplary embodiment. The system includes a seatback frame 20, a support member 30, an adjustment device 40 and a display device 50. The system may also include a wide variety of additional components as shown for example in FIGS. 2A-4. The seatback frame 20 may be a conventional seat frame for use in any of a wide variety of vehicles. The support member 30 is shown having a bottom end 32 that is mounted (connected, coupled, attached, integrally formed, etc.) at or generally near a top portion 22 of the seatback frame 20 by any suitable process such as welding, brazing, threaded fasteners, integral formation with the seatback frame, etc. The support member 30 may be attached to any suitable portion of the seatback frame 20 (e.g. sides, back, etc.), so that a portion of the frame extends behind a headrest attached to the seatback. Referring to FIGS. 2A-6, the support member 30 is shown to extend upwardly from a location near the top portion 22 of the seatback frame 20 and adjacent to, and behind, a headrest 24 of the seatback to provide a "high mount" arrangement for the display device 50. The support member may be made of any suitable material (such as steel, aluminum, plastic, etc.) and attached to the seatback frame during production of the seatback. A top end 34 of the support member 30 is configured to receive an adjustment device 40 that is shown to interconnect what is shown for example as a top portion of the display device 50 to the support member 30 at an attachment point. According to one embodiment, the support member is plastic-coated or encased, however, the support member may be finished in any suitable manner to match or contrast (as desired) with other interior trim features of the vehicle, such as painted, anodized, epoxy coated, plasticized, vinyl coated, fabric-wrapped, leather-wrapped, etc.

According to one embodiment, the support member 30 is also shown having a shape that is intended to remain generally "concealed" or hidden behind the display device 50 when the display device is in a "stowed" position against the support member (see FIGS. 1-2A), so that the display device retains an appearance similar to that of a "hard-mounted" type of display device, yet permits the advantageous adjustment features of the embodiments described herein. According to another embodiment the support may be sized and shaped to remain visible when the display device is stowed and may be configured to have an aesthetic appearance that compliments or contrasts with the seat back and/or display device. According to the illustrated embodiment, the support member 30 is shown as a generally rigid member having a strength suitable for use with all intended loading scenarios that may be potentially experienced by the display device and/or support member. According to an alternative embodiment, the support member may also include a restorable "break-free" feature (such as a snap-hinge, over-center biasing device, etc.) that is intended to "fold" or collapse in the event of loading or impact in excess of a certain predetermined amount (e.g. if a person "pulls" or "leans" on the display device, or otherwise stresses the display device or support member) to prevent damage to the display device, and/or the adjustment mechanism and/or the support member.

According to one embodiment, the adjustment mechanism 40 is intended to permit movement of the display device 50 (and other components such as those shown in FIGS. 2A-4) in a forward-rearward (e.g. tipping, tilting, folding, draw-forward, push-back, etc.) manner (i.e. rotation about a horizontal axis—see FIGS. 6A-7) through a desired adjustment range, such as range of approximately 0 through 60 degrees. Referring to FIG. 6B, the display device may be arranged for pivoting upward approximately 180 degrees to accommodate positioning of the vehicle seat when protection of the display is desired (e.g. when moving the seatback to a "fold flat" position to prevent damage to the display device, etc.). The adjustment mechanism 40 is also intended to permit a side-to-side (e.g. pivoting, swinging, sliding, etc.) manner (i.e. rotation about a vertical axis) through a desired adjustment range, such as range of approximately 0 through 30 degrees and an up-down (e.g. raise, lower, etc.—see FIG. 4) manner, and a side-to-side manner (see FIG. 3) so that the display panel may be movable by translation generally along a plane defined by the support member or the adjustment device) along a travel distance in an amount up to about the height of the support member 30. However, the adjustment mechanism may be selected to provide only one (or certain several) of these adjustment features to suit a particular application or customer. According to one embodiment, the adjustment mechanism is intended to provide a mechanical connection between the support member and the display device. The connection is intended to facilitate use of a quick-release device to permit the display device-(and its associated components) to be removed for use at other locations, and to facilitate interchangeability to permit upgrade/replacement of the display device (and its associated components).

The adjustment mechanism 40 may be selected as a commercially available product that permits a desired range of motion and may also include a "friction-creating" or "torque-resisting" interaction (such as a "torque hinge" or torque washers or counter-balanced springs or the like for the rotational adjustment features) or may be custom-made to incorporate the desired features or combination of features. The adjustment mechanism may also include "retention" features (e.g. viscous or frictional interfaces, dampers, spring-assist devices, etc.) that tend to "hold" or "retain" the display device in a desired position after adjustment to a desired viewing angle by a viewer and until subsequently repositioned by the viewer. According to one embodiment, the retention features have sufficient retentive strength to maintain the position of the display device during normal usage and movements of the vehicle. However, the strength of the retention features is intended to be low enough to permit convenient manual adjustment of the display device and to permit "release" of the position of the display device upon impact with an occupant or other object in the vehicle. The horizontal axis pivoting and vertical axis pivoting feature of the adjustment mechanism 40 may be provided by any suitable rotational device such as a hinge, pin-and-socket, bearing, bushing or the like (shown for example as hinge 42 for adjustment about a horizontal axis). The up-down and side-to-side translation adjustment feature may be provided using a slide, track, rail or the like, that interfaces between (or is incorporated in), the adjustment mechanism 40 and either of the display device 50 or the support member 30. According to the illustrated embodiment, up-down adjustment is provided by a track 36 provided in the support member 30 and is configured to slidably receive a corresponding projection extending from the adjustment mechanism 40 (see FIG. 7). Side-to-side adjustment is shown provided by a track 52 on the display device 50 that engages a projection or tab (shown as a tang 46) extending from hinge 42 on the adjustment mechanism 40 (see FIG. 7). According to an alternative embodiment the pivotal/rotational features of the adjustment mechanism may comprise a ratchet and pawl device with a release mechanism (such as a spring-biased button, lever, latch, etc.).

According to other embodiments, the adjustment features may be accomplished by other suitable devices such as a ball-and-socket device, a viscous coupling device, pinned linkages (that permit the display device to telescope, articulate, etc.). According to another alternative embodiment, the position of the display device may be remotely adjustable through suitable motors, servos, actuators or the like (e.g. of a "miniature" size, etc.) and may be activated through controls on the display device or by a remote control device, such as the remote control that operates a media device associated with the display panel. According to a further alternative embodiment, the adjustment mechanism may include a side-to-side translation feature to permit lateral movement of the display device. According to a further embodiment, the adjustment mechanism (or its attachment point) may be provided with a quick-release device that permits the display device to be removed by a user, such as for security purposes, or for use remote from the vehicle (such as a hotel, or other suitable application or location). The quick release device may include a locking device (such as a key, etc.) to minimize unintended removal of the display device.

Figure 1:
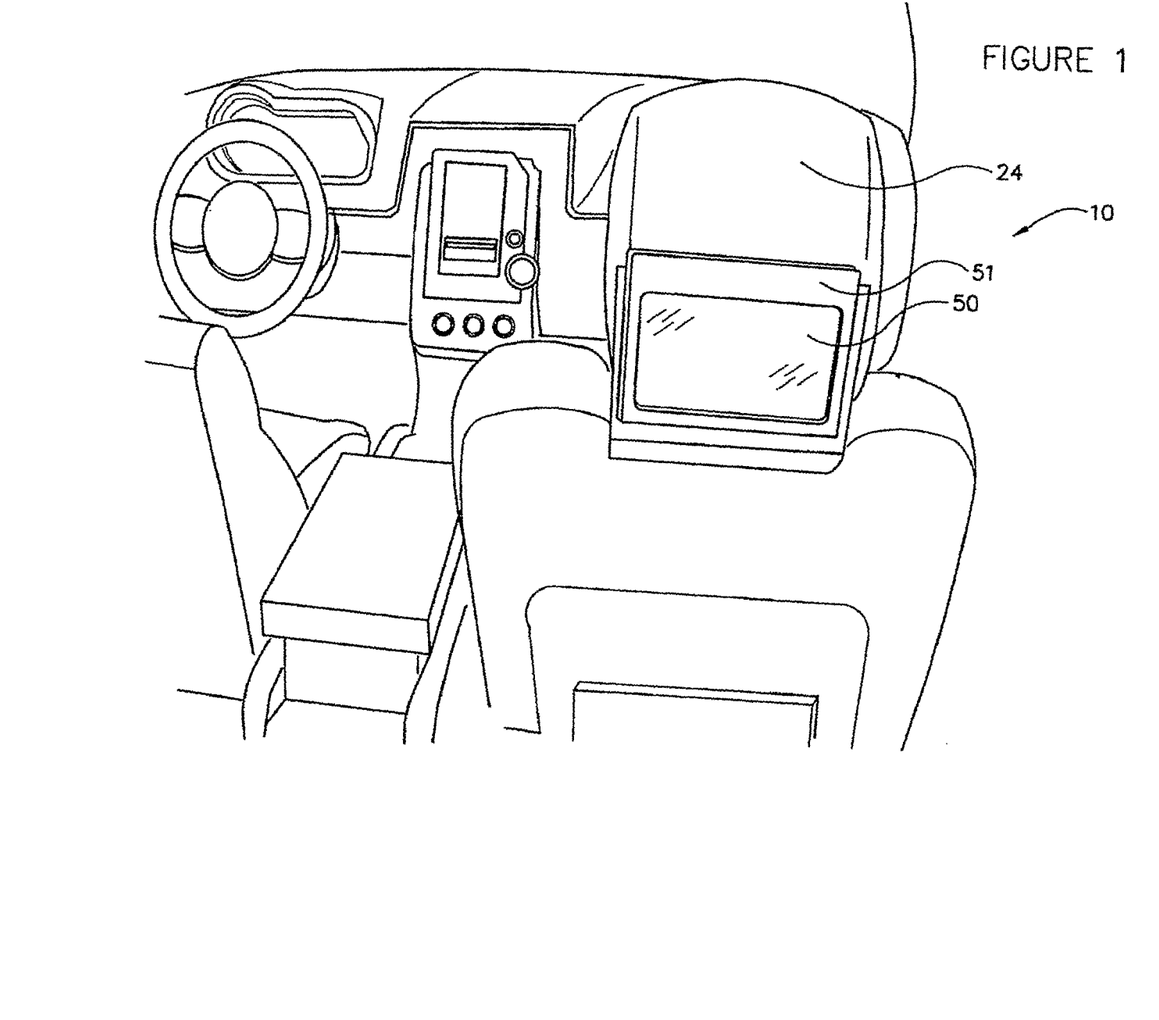
FIG. 1 is a schematic representation of a seatback entertainment display system for a vehicle according to an exemplary embodiment.
Figure 2A:
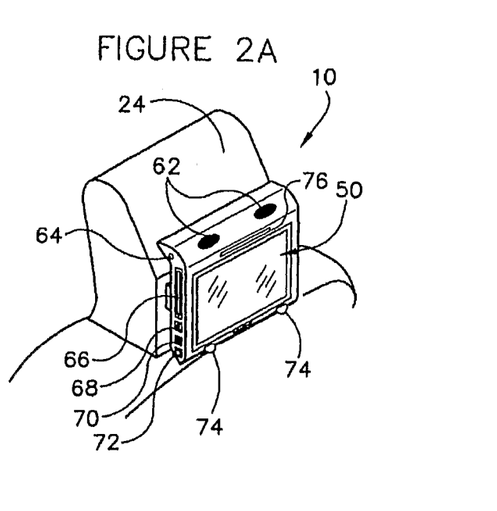
FIG. 2A is a schematic representation of a perspective view of a seatback entertainment display system with a display device in one position according to an exemplary embodiment.
Figure 2B:
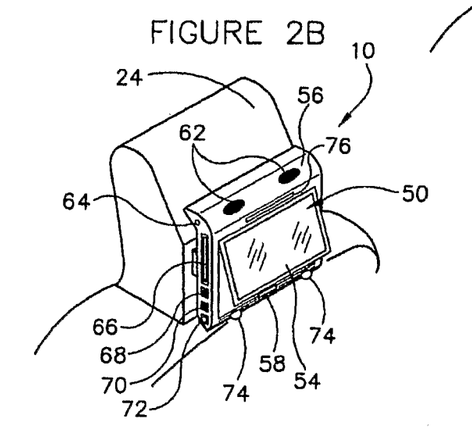
FIG. 2B is a schematic representation of a perspective view of a seatback entertainment display system with a movable display screen portion according to an exemplary embodiment.
Figure 2C:
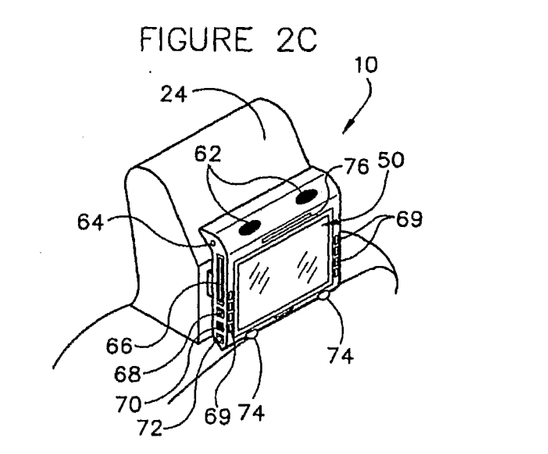
FIG. 2C is a schematic representation of a perspective view of a seatback entertainment display system with a display device shown with controls according to an exemplary embodiment.
Figure 2D:
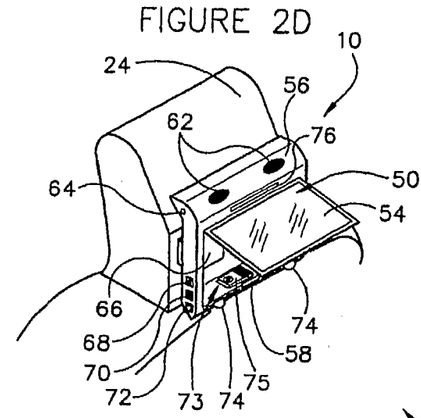
FIG. 2D is a schematic representation of a perspective view of a seatback entertainment display system with a movable display screen portion, and a drive and a compartment for accessory item(s) located behind the screen, according to an exemplary embodiment.
Figure 3:
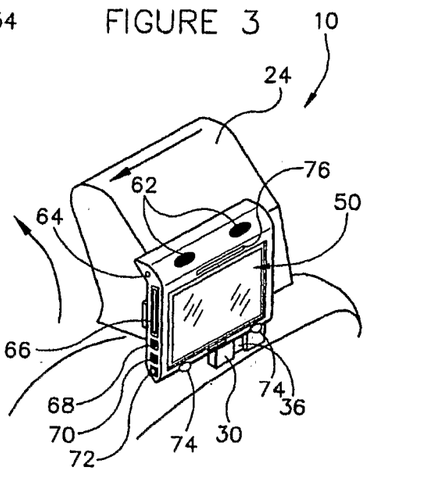
FIG. 3 is a schematic representation of a perspective view of a seatback entertainment display system with the display device in another position according to an exemplary embodiment.
Figure 4:
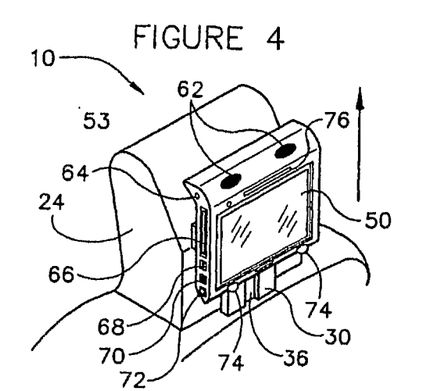
FIG. 4 is a schematic representation of a perspective view of a seatback entertainment display system with the display device in another position according to an exemplary embodiment.
Figure 5:
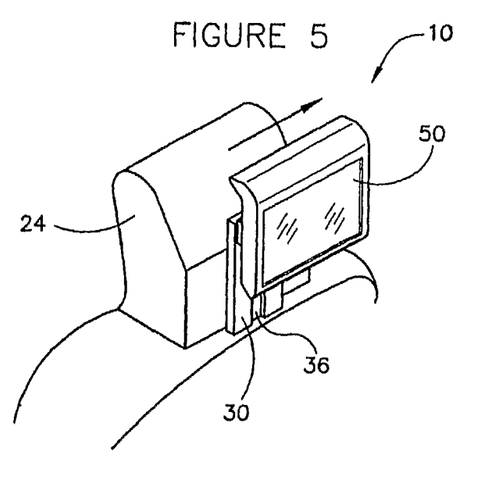
FIG. 5 is a schematic representation of a perspective view of a seatback entertainment display system with the display device in another position according to an exemplary embodiment.

According to an alternative embodiment shown in FIG. 2B, the display device 50 may be provided as a two-part device that includes a screen portion 54 that is movably connected to a body portion 56 of the display device 50 to permit a further adjustment range for viewing images by a user. The screen portion 54 is shown pivotally coupled along a top edge to the body portion 56, such as by use of a torque hinge or the like. An indentation in body portion (shown as a finger relief 58) is provided adjacent a lower edge of the display screen to enhance ease of a use by an occupant of the vehicle in positioning the screen.

According to another embodiment, the adjustment device is configured as a low-profile (e.g. thin, slim, narrow, etc.) device that minimizes the package space of the display device behind and adjacent the headrest of the seatback. The adjustment device 40, in combination with the support member 30, is intended to permit a viewer to selectively customize the viewing angle of the display device 50 in any one of an almost infinite number of positions, to accommodate a particular viewer (e.g. short, tall, etc.), the location of the viewer (e.g. directly behind the seat, offset from the seat, etc.) and to permit adjustment to maintain the desired viewing angle when the seatback and/or headrest are adjusted or repositioned by the occupant of the seat. For example, if an occupant of the vehicle seat reclines the seatback, the viewer may adjust (e.g. tilt) the display device and/or raise the display device to maintain a desired viewing angle. By further way of example, since the display device is mounted independent of the headrest, an occupant of the seat may adjust the headrest to any desired elevation or inclination without changing the position of the display device.

Referring further to FIG. 2A-4, the display device is shown to include a variety of additional components and/or features intended to enhance the functionality of the display. For example, the display device may include speakers 62 for broadcasting audio to the user of the display. Ambient lighting may be provided by light sources, such as LEDs 64, mounted along a perimeter (or side or back) of the display device to provide multi-colored lighting that is coordinated with the images displayed on the screen of the display device. A media device, shown for example as a DVD player 66, may be integrated into the display device, and may have an access door shown as provided along a side or top of the display device. The display device is also shown to be equipped with connectivity ports 68 (e.g. USB, etc.), a headphone jack 70, and auxiliary input 72 (e.g. for an RCA or ⅛" jack, etc.). Reading lamps 74 are also shown to be provided along a lower edge of the display device, and may be positioned for directing the beam of light to a desired location by adjusting the position of the display device. The display device is also shown to include an infrared transmitter and receiver 76 (e.g. for communicating with a remote control device, or other suitable interface). The display device may also be outfitted for wireless communication, such as Bluetooth, WiFi, etc.). The trim surrounding the display screen may also include decorative accent lighting, such as in the form of one or more "bands" that "glow" or otherwise provide a decorative appearance that may be either independent of an image on the screen or coordinated with an image on the screen. Referring further to FIG. 2C, control devices 69 (e.g. buttons, knobs, dials, etc.) may be provided at any suitable location to permit local operation of the display device 50. Referring further to FIG. 2D, the display device may be provided without visible control devices and configured for operation by a remote control device 75. As shown by way of example in FIG. 2D, the display device may be provided with a compartment 73 located behind the movable display screen for stowing or storing accessory items, such as, among others, the remote control device, movie media, batteries, battery packs, USB items, etc. The display device 50 may also include other components arranged (or "hidden") behind a movable display screen, such as an SD card slot, etc. For example, FIG. 2D further illustrates a drive device 66 (shown as a DVD player drive) arranged behind the movable display screen.

According to other embodiments, the display device may include a face plate or trim bezel 51 (see FIG. 1) that is detachable or replaceable so that the display device may be customized by a user. For example, replacement bezels may be provided in a wide variety of customized styles such as color, texture (e.g. wood grain, carpet, fabric, etc.), graphics (e.g. favorite team logos, characters, locations, organizations, etc.).

According to another embodiment, the display device may include a camera 53 (see FIG. 4) arranged to display an image on the display screen (e.g. for use as a "vanity mirror" or the like).

According to any exemplary embodiment, the display device 50 may include any suitable technology for receiving a signal from a media device and conveying an image to a viewer. By way of example, the display device technologies may include (among others) LCD, plasma, OLED, emissive or transflective devices, field emission devices, and may be provided as color or monochromatic displays. The screen may also provide touch-screen interaction for receiving input commands from a user. All such display screen technologies are intended to be within the scope of the embodiments of the invention.

Figure 8A:
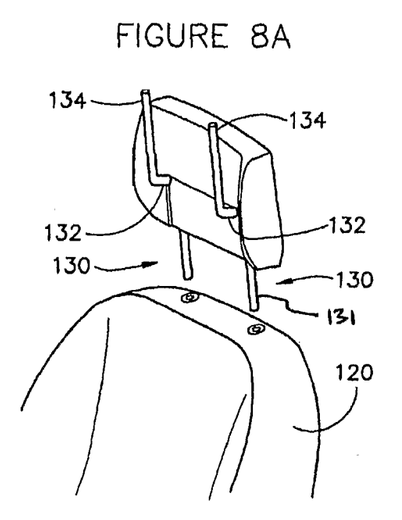
FIGS. 8A-8D are schematic representations of a seatback entertainment display system integrated with a support member (shown as rods for a headrest), according to another exemplary embodiment.
Figure 8B:
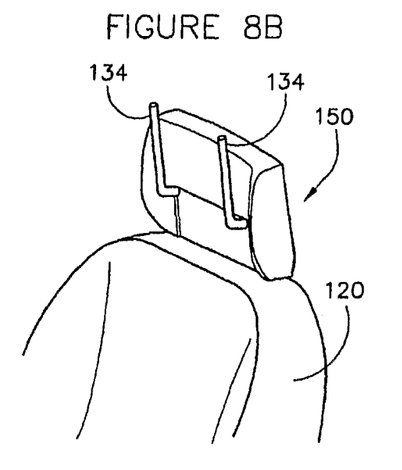

Referring to FIGS. 8A-8D, a seatback entertainment display system 110 integrated with support members (shown as rods 130) for a headrest 124 is illustrated according to another exemplary embodiment. According to a preferred embodiment, a pair of rods 130 are compatible with apertures on the seatback and on the headrest. As shown in FIG. 8A, the seatback 120 is be provided with apertures for receiving and securing support members (shown as downwardly projecting lower segments 131 of rods 130). The lower segments 131 of rods 130 are configured to secure the display device 150 to the seat back. A body portion 152 of display device 150 also includes upwardly projecting segments 134 of rods 130 to adjustably support the headrest 124.

The rods 130 may each be single rods having a lower projecting segment 131, an intermediate segment 132 and an upper projecting segment 134. Alternatively, rods 130 may be provided in separate segments integrated with the body portion 152. Display device 150 is secured to the seatback 120 by the rods 130 in a position behind the headrest 124. Body portion 152 connects to the rods 130 (shown at an intermediate segment 132 of the rods) in a generally fixed manner for mounting the display device 150 to the seatback 120, with a bottom segment 131 of rods 130 inserted within the apertures and secured to the seatback 120 (see FIG. 8B). According to one embodiment (as illustrated), the intermediate segment 132 of the rods includes a generally horizontal "bend" or offset region that aides in retaining the body portion 152 in a fixed position. According to other embodiments, the rods may have any desirable configuration that secures to the seatback and mounts the display device in a fixed position behind a movably-mounted headrest. For example, the rods may each have a "Y" shape where one branch movably mounts the headrest and another branch fixedly mounts the display device, and the bottom leg is secured to the seatback.

Figure 8C:
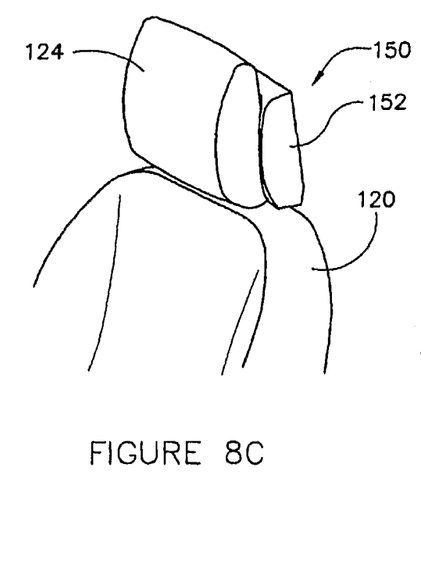

Referring further to FIG. 8C, according to the illustrated embodiment, the headrest 124 is movably mounted over an upward segment 134 of the rods 130 so that the headrest 124 is positioned adjacent to, and in front of, the display device 150. The headrest 124 is vertically positionable through an adjustment range along the upper segment 134 of the rods 130, independent from the body portion 152 of the display device 150, which remains generally fixed relative to the seatback 120 and rods 130. The headrest may also be configured to be horizontally adjustable relative to rod segments 134 to enhance positioning to accommodate particular users. Accordingly, the headrest 124 is adjustable, while the body portion 152 of the display device 150 is intended to remain generally fixed relative to the seatback 120 in a position adjacent to, and behind, the headrest. According to alternative embodiments, the body portion of the display device may be movably mounted to the support member (so that the display device and the headrest are independently movable relative to one another and to the seatback) to increase the amount of adjustment available to a user.

Figure 8D:
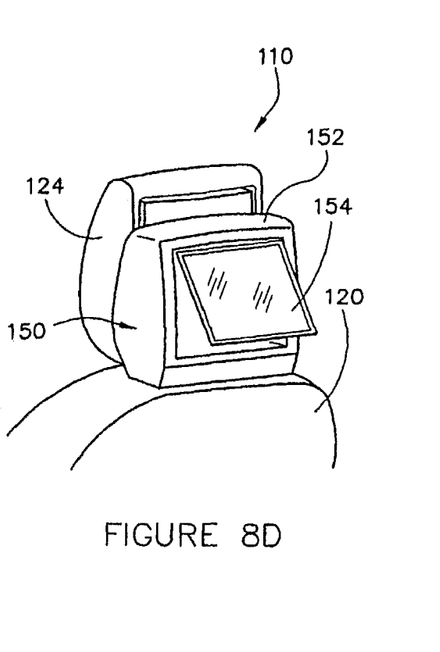

Referring to FIG. 8D, the display device 150 includes a movable display screen 154 that is pivotally connected along a top edge of the screen to the body portion 152, so that a user may pivotally adjust a viewing angle of the display screen 154 in a manner that is independent from the position of the seatback 120 or headrest 124. Display device 150 may include any one or more of the variety of features, characteristics and capabilities as previously described in relation to the display device 50 of FIGS. 2A-4.

According to another alternative embodiment, the headrest and display device may be integrated together using a bracket, such as the support member shown in FIG. 7. According to such an embodiment, a display device (with a pivoting display screen) may have a body portion fixedly secured to the support member, and a pair of rods are integrated with either the support member or the display device. The rods are arranged to movably mount the headrest in front of the display device for vertical adjustment of the headrest relative to the seatback within a predetermined range.

According to any preferred embodiment, the seatback entertainment display system provides an improved system and method for optimizing an adjustment of the viewing angle for a rear seat display device 50, 150. The system permits a viewer to adapt the display device 50, 150 to any desired viewing angle independent of the position of the headrest on the seatback, or the position of the seatback (e.g. reclined, upright, etc.) and the elevation of the seatback (raised, lowered, etc.). The system is also intended to reduce cost by (among others) providing a relatively standardized system usable on any of a wide variety of seatback frames.

The construction and arrangement of the elements of the seatback entertainment display system as shown in the preferred and other exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited herein (e.g., the variety of adjustment features may be chosen or selected and combined to suit any desired application). For example, elements shown as integrally formed may be constructed of multiple parts or elements, the position of elements may be reversed or otherwise varied, and the nature or number of discrete elements or positions may be altered or varied. It should be noted that the elements and/or assemblies of the support member may be constructed from any of a wide variety of materials that provide sufficient strength or durability, including any of a wide variety of moldable plastic materials (such as high-impact plastic) in any of a wide variety of colors, textures and combinations. Other substitutions, modifications, changes and omissions may be made in the design, operating conditions and arrangement of the preferred and other exemplary embodiments without departing from the scope of the present inventions.

The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating configuration and arrangement of the preferred and other exemplary embodiments without departing from the spirit of the present inventions as expressed in the appended claims.

What is claimed is:

1. A seat for a vehicle, comprising:
    a seat bottom frame coupled to a seatback frame, the seatback frame supporting a seatback;
    at least one support member extending substantially upwardly from the seatback frame, wherein a first end of the support member extends substantially downwardly into the seatback wherein the support member is rigidly coupled to the seatback frame within the seatback;
    a display device having a body portion coupled to a second end of the support member in a generally fixed position, and a screen portion pivotally coupled to the body portion along a top edge of the screen portion for movement to any one of a plurality of viewing positions; and
    a headrest movably coupled to one of the body portion and the support member for positioning of the headrest within a predetermined adjustment range relative to the seatback and the body portion of the display device.

2. A seat for a vehicle, comprising:
    a seat bottom frame coupled to a seatback frame, the seatback frame having a pair of apertures;
    a display device having a body portion, the body portion having a first pair of rod segments extending down from the body portion and configured to be received and secured within the apertures of the seatback frame, the body portion having a second pair of rod segments fixed in place relative to the body portion, the second pair of rod segments having a first portion and a second portion, wherein the first portion extends longitudinally forward, wherein the second portion extends upwardly for being received by apertures of a headrest, wherein the apertures of the headrest are not aligned with the pair of apertures of the seatback frame;
    wherein the headrest is vertically adjustable relative to the display device and the seatback frame by being movable along at least a portion of the second pair of rod segments.

3. The seat of claim 2 wherein the headrest is movably positioned forward of, and adjacent to, the body portion of the display device.

4. The seat of claim 2 further comprising a display screen having a top edge pivotally connected to the body portion of the display device.

* * * * *